(12) United States Patent
Butler

(10) Patent No.: US 7,913,684 B2
(45) Date of Patent: Mar. 29, 2011

(54) SOLAR HEAT TRANSFER SYSTEM (HTPL), HIGH TEMPERATURE PRESSURIZED LOOP

(76) Inventor: Barry Lynn Butler, Solana Beach, CA (US)

( * ) Notice: Subject to any disclaimer, the term of this patent is extended or adjusted under 35 U.S.C. 154(b) by 179 days.

(21) Appl. No.: 10/085,175

(22) Filed: Feb. 27, 2002

(65) Prior Publication Data

US 2003/0159690 A1    Aug. 28, 2003

(51) Int. Cl.
*F24J 2/40*    (2006.01)

(52) U.S. Cl. ......... 126/589; 126/599; 126/634; 126/641

(58) Field of Classification Search .................. 126/570, 126/588, 589, 598, 599, 634, 642, 646, 641, 126/635, 645, 643; 174/47; 138/137, 151, 138/161
See application file for complete search history.

(56) References Cited

U.S. PATENT DOCUMENTS

| | | | | |
|---|---|---|---|---|
| 1,959,302 A | * | 5/1934 | Paige | 174/47 |
| 3,661,202 A | * | 5/1972 | Moore, Jr. | 165/104.26 |
| 4,043,317 A | * | 8/1977 | Scharfman | 126/596 |
| 4,219,009 A | * | 8/1980 | Palmer | 126/599 |
| 4,269,167 A | * | 5/1981 | Embree | 126/646 |
| 4,282,857 A | * | 8/1981 | Pei | 126/588 |
| 4,360,003 A | * | 11/1982 | Hardy | 126/367.1 |
| 4,399,319 A | * | 8/1983 | Zinn | 174/47 |
| 4,413,615 A | * | 11/1983 | Sigworth, Jr. | 126/643 |
| 4,557,252 A | * | 12/1985 | Dinh | 126/588 |
| 5,310,594 A | * | 5/1994 | Holland et al. | 138/151 |

FOREIGN PATENT DOCUMENTS

| | | | | |
|---|---|---|---|---|
| JP | 59-93149 A | * | 5/1984 | 126/589 |
| JP | 61-122457 A | * | 6/1986 | 126/589 |

* cited by examiner

*Primary Examiner* — Alfred Basichas

(57) ABSTRACT

Delivering heat from modern high temperature solar collectors to hot water storage tanks is more effectively done using unpressurized when cold, self-pressurized on heat up, automatic air eliminating, higher temperature fluid loops. A pressurizing valve, an overflow reservoir and a vacuum relief valve are used. Non-toxic water/antifreeze mixtures are pressurized up to about two atmospheres resulting in a 265° Fahrenheit boiling point. Loss of circulation under full sun results in solar collector boiling under pressure. The steam generated in the solar collector is condensed in the pressurized liquid-to-air radiator, a steam heat pipe, and water is returned to the solar collector to keep it completely full of fluid and steam. A set of pressure-actuated air dampers on the solar collector can also be used to shed the excess solar collector heat.

4 Claims, 6 Drawing Sheets

SOLAR HEAT TRANSFER SYSTEM (HTPL), HIGH TEMPERATURE PRESSURIZED LOOP

BACKGROUND OF INVENTION

This invention pertains to the collection and the delivery of heat from a roof or a ground mounted solar collector panel to a hot water storage tank via the use of a self-pressurized, high temperature fluid-filled loop, which eliminates non-condensable gases, such as air, from the fluid loop. The pressurized loop system utilizes a mixture of water and antifreeze or another suitable fluid is circulated via a pump. In addition, the system is self-protected from over-temperature and over-pressure if the circulating pump fails. The higher temperature, compared to an unpressurized, fluid heat transfer loop allows for a smaller heat transfer area and hence a more compact hot water tank heat exchanger, and a small diameter (approximately two inch), flexible, insulated umbilical which contains both electrical and fluid tubing connections (approximately ¼ inch outside diameter tubing) to go both out and back from the hot water tank to the solar collector for ease of installation. This heat transfer loop system is unique since there are savings in materials for heat exchangers, piping, and insulation. The system also has built-in air elimination, self-protection from overheating and automatically keeps the system full of fluid.

PRIOR ART

Most common solar collector systems are either unpressurized or pressurized via an air bladder expansion tank and make use of a large area heat exchanger external to the water tank to exchange heat from the solar loop to the city water pressure in the hot water tank. Unpressurized collector heat transfer loops are limited to the boiling point of the water/antifreeze mixtures, typically a 50/50 mix, at atmospheric pressure of approximately 220° Fahrenheit. A water/antifreeze mixture of approximately 50/50, pressurized to 14 psig, or approximately two atmospheres in the collector loop, will not boil until 265° Fahrenheit. The higher operating temperature in the collector loop allows for small surface area, efficient, in the hot water tank, heat exchangers to be utilized, which do not disturb the normal tank stratification. Internal tank heat exchanger also eliminates the pump that would circulate water from the hot water tank through the external heat exchanger. The stratification of the normal hot water tank, hot on top and cooler on the bottom, is disturbed by circulating water from the hot water storage tank, through the external heat exchanger. It is important not to disturb the normal tank stratification because it decreases the normal gas or electric heater efficiency.

Some solar collectors use pressurized drinking water and flow this water through the solar collector to heat it before it goes to the hot water tank inside the house. Other systems called integrated collector storage have a roof-mounted hot water tank above the solar collectors filled with drinking water. The fresh potable water is subject to freezing and must be heated electrically at night to keep the roof-mounted solar collector or integrated solar collector/hot water tank from freezing during cold weather. Other systems circulate potable water through the solar collectors only when they are illuminated by the sun, and must drain this water out at night during freezing weather. Drain down systems send the solar collector water down the drain, and get new fresh water the next day. Drain back systems have a holding tank that the solar collector water can drain into and be used over and over.

Main advantages: 1) Pressurized antifreeze heat transfer loops allow solar collectors and tank heat exchangers to operate up to 265° Fahrenheit; 2) Pressurized heat transfer loops allow heat to be transferred with very low fluid flow rates minimizing pumping power and allowing small diameter tubes to take fluid to and from the solar collector and water tank heat exchanger; 3) Keeping the fluid loop full of fluid and eliminating non-condensable air minimizes corrosion of the fluid loop containment walls; 4) Internal small area heat exchangers adapt to existing tanks with minimum re-plumbing and without tank removal or draining; 5) Heat exchanger is efficient; 6) Double wall heat exchanger safely separates toxic heat transfer fluids from potable water; 7) This solar system costs less to install and maintain; and 8) Solar system maintains normal tank stratification.

SUMMARY OF INVENTION

In summary, the present invention is a closed fluid loop solar system which is unpressurized when cold and upon heating becomes self-pressurized by fluid thermal expansion. The pressure is limited by a pressure relief valve which allows trapped gas and fluid to leave the closed-loop system and go to the overflow reservoir. Upon cool down the vacuum caused by fluid thermal contraction draws fluid back into the system from the overflow reservoir through a slightly sub-atmospheric vacuum relief valve. The normal daily heating and cooling cycles keeps the system full of fluid by automatically eliminating non-condensable gases such as air. The solar panel illuminated by the sun, heats a solution of water-based antifreeze or other suitable liquid, the fluid is pumped at low flow rate to a hot water tank where the fluid transfers heat via a heat exchanger to the hot water tank. The fluid loop is self-pressurized and can operate above the normal boiling point of water 212° Fahrenheit. The fluid loop also has a built-in boiling and pressure-actuated over-temperature protection and over-pressure protection, so if the fluid circulation pump stops while the sun is shining the solar collector will not get too hot and damage itself, or make the heat transfer fluid more corrosive to the containment materials.

The primary objective of the present invention is to reduce the amount of material needed to collect and transport solar heat. This is accomplished by increasing the pressure and hence the temperature in the fluid filled loop, which decreases the area of the hot water tank to fluid loop heat exchanger surface needed. The higher fluid temperature difference, between the hot water tank and the solar collector, allows more heat to be stored in each unit volume of fluid in the solar collector heat transfer loop. For a smaller volume of fluid, a lower flow rate is needed to deliver the heat from the solar collector to the hot water tank. The higher fluid temperature in the collector will lower the collectors' efficiency, since it is losing heat to the outside air. This loss is a small price to pay for a system using significantly less material.

Another objective is to reduce the time and complexity of retrofitting solar energy to existing homes, since it uses flexible small diameter tubing to carry the low fluid flow volume. The small diameter of the fluid carrying tubes, approximately ¼ inch outside diameter, also allows them to be thermally insulated and still be less than two inches in diameter. By adding an electrical wire bundle to the insulated fluid carrying tubes and wrapping them with a protective covering, an umbilical cord is created, which carries all fluids and electrical signals from the hot water tank to the solar collector. This plug and play umbilical allows for do-it-yourselfers or professionals to install the system more quickly. These fluid carrying tubes can be installed in existing buildings because they are flexible and can be fed into and through attics, walls and placed on the outside of buildings, without being unsightly.

Additional objectives, advantages and novel features of the invention will be set forth in the description which follows and will become apparent to those skilled in the art upon examination of the following. Others may be learned by the practice of the invention. The objectives and advantages of the invention may be realized and attained by means of the instrumentalities and combinations particularly pointed out in the appended claims.

DETAILED DESCRIPTION OF THE PREFERRED EMBODIMENT

Figure 1:
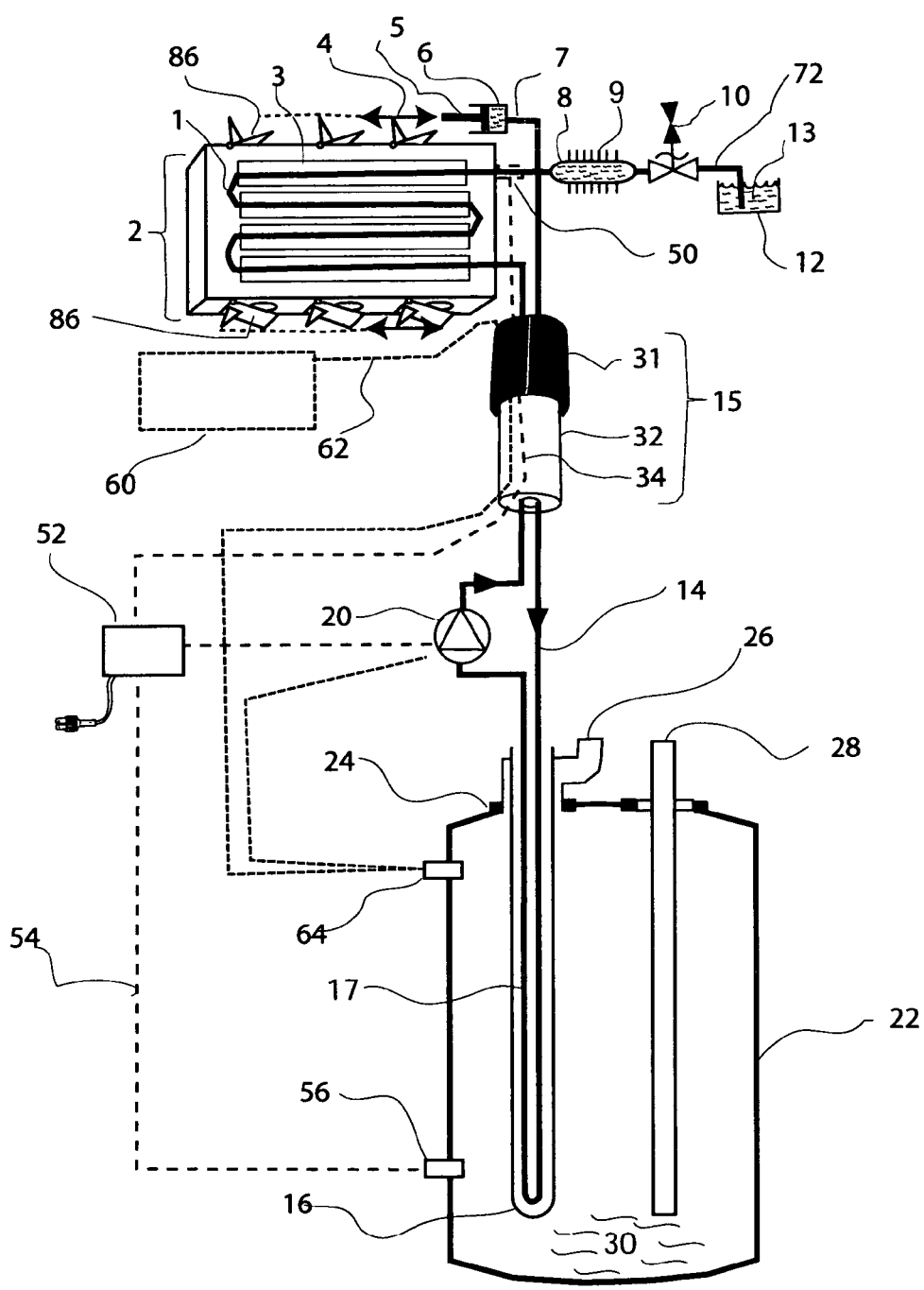
FIG. 1 is a perspective view of the pressurized loop solar collector system, including the fluid loop, the solar collector, the hot water tank heat exchanger, the fluid pump, controller, the over-pressure relief and the vacuum relief and overflow reservoir, and both liquid-to-air radiator and pressure-actuated air damper over-temperature systems.

The invention (FIG. 1) consists of a pressurized heat transfer loop (1, 14 &17) which operates above the boiling point of water at one atmosphere of pressure, 212° Fahrenheit. The heat transfer fluid (13) is heated, in the solar collector tube (1) by the sun. The solar collector (2) can be single, or double glazed. The heated fluid then exits the solar collector in tube (1) and comes to a three-way connection. Path one (7) goes to the pressure actuator (6), which can move the actuator arm (5) to actuate air dampers with motion (4). Path one may not be needed if the path two pressurized fluid/steam-to-air radiator is sufficient to prevent overheating. Path two goes through a pressurized radiator (8) with fins (9) to a pressure relief valve (10) which includes a vacuum recovery valve to let expelled heat exchanger fluid (13) back into the system from the fluid overflow/recovery reservoir (12), while excluding non-condensable air. Path three (14) is the fluid tubing leading to the hot water tank (22) heat exchanger (16). The insertable, internal heat exchanger is screwed into the tank through a tank port (24) and allows water tank fluid (30) ingress or egress via a side port (26). The inside of the outer heat exchanger wall (16) is in physical contact with the outside of tubes (14 & 17). Physical contact means that over a significant area or approximately 50% of the surfaces, the interfaces are compressed together mechanically so heat can cross the interface, but leaking liquid from either side will move along the interface. The tube (14) turns around in the bottom of the heat exchanger and becomes the tube (17) exiting the heat exchanger. The tubes (14 & 17) are much hotter than the water in the hot water tank (30) and are in physical contact with the wall (16) so the heat is transferred from the heat transfer fluid (13) through the first wall (14 or 17) then through the mechanical interface to the second wall (16) then into the water (30). Once the tube (17) leaves the heat exchanger it returns to the pump (20) inlet. The tube (17) then returns to the solar collector tube (1) for the heating of the fluid (13).

To transport the pressurized fluid and the heat it contains from the solar collector to the hot water heater a flexible insulated umbilical is used (15). The umbilical consists of thermally insulated fluid connections (14 & 17) from the solar collector (1 & 2) to the hot water tank, rubber closed-cell thermal insulation (32), the low voltage electrical connections and a weather resistant covering of polymer pipe (31), the two small diameter tubes (14 & 17) containing the solar collector heated fluid (13). This allows the two-tube bundle to be flexible and insulated (32) and still be less than 2 inches in diameter. The small copper tubes are connected together with standard tubing unions, angles and T-connectors of about ¼, 5/16, or ⅜ inch tube size.

The solar collector (2), an integral part of the collector, is a set of dampers which are opened by pressure (15). These dampers are only open when the solar heat collected is more than the hot water tank can use. These dampers when opened allow outside air of less than 120° Fahrenheit to flow over the absorber plate, where the sunlight is converted to heat and transferred into the heat transfer fluid. This airflow cools the absorber and stops the boiling. Then the dampers close and the absorber heats back up. The dampers open and close on a two to five minute cycle and only minor boiling is allowed to take place. This self-controlling feature is unique and allows the collector to protect itself, even if the fluid flow in the pressurized loop (1, 14 & 17) stops. Alternatively to the dampers, or along with them, one could use the boiling-activated radiator system shown in (FIGS. 1, 2 & 4), which is a pressurized side channel to the main pressurized heat transfer loop, which is at the uppermost point in the main fluid loop. As steam bubbles form in the solar collector they try to escape by going into the side channel heat exchanger. The fluid there is below the boiling point of the pressurized fluid and they collapse and condense. The fluid in the side channel is cooler because the outer surface is exposed to the outside air via fins (9). If no bubbles are forming in the solar collector, then there is no flow of fluid in the side channel and the fluid in the side channel stays cool.

The system has two possible configurations for activating the heat transfer fluid pump (20). The first is a conventional control system run by household 115VAC power. This control system has a control box (52), which plugs into the wall outlet and has two sensors. The collector has a temperature sensor using low voltage (50), where the electrical wires are part of the umbilical to tell the controller, which turns on the pump, when the solar collector temperature exceeds the hot water tank temperature, which is measured by sensor (56) on the hot water tank. The sensor (56) is usually placed near the top of the tank (22), which tells the controller when the tank is getting too hot, i.e. no one home to use hot water, then the controller will shut off the pump. This would now cause the pressure damper or side channel heat exchanger to protect the collector from excessive boiling, which would block the collector solar collector tubes with mineral deposits over time.

The second pumping system is based on using a photovoltaic array (60), which provides 12 Volt power when the sun is shining. This power is carried down to the pump on the umbilical connector wire. The pump is a DC powered pump, which is capable of low flow at modest pressures. A control box may not be necessary. When the sun is out the pump is on, when the sun is not out, the pump is off. A thermal disconnection switch (64), is placed on the top of the hot water tank, so if the hot water tank gets too hot, it will disconnect the pump.

Figure 2:
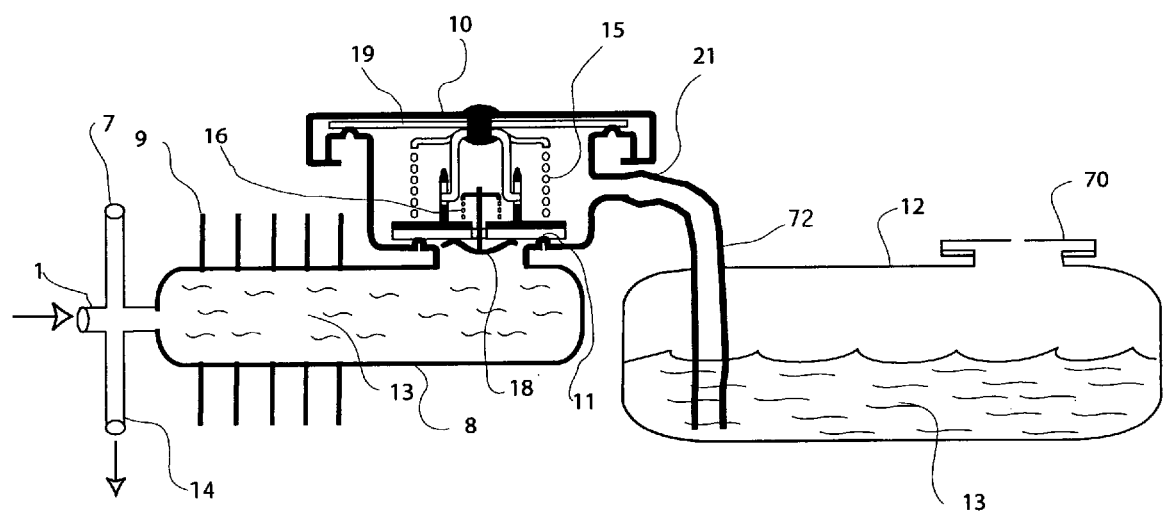
FIG. 2 is a view of the boiling-activated solar collector over-temperature system including the pressurized liquid-to-air radiator, the pressure relief valve, the vacuum recovery valve and the overflow fluid reservoir.
Figure 6:
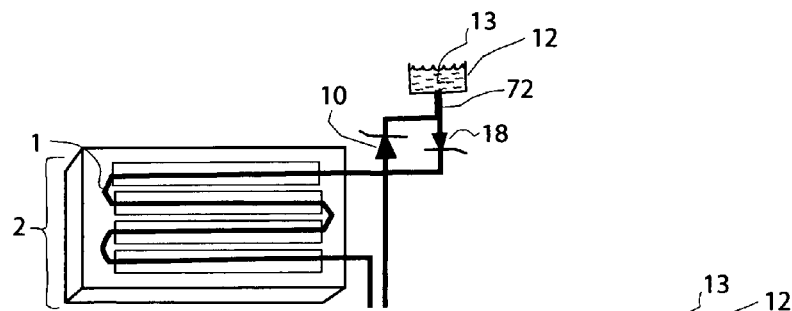
FIG. 6 Preferred embodiment of the pressure/vacuum management and air elimination device.

The invention also consists of a pressurized radiator, pressure relief and vacuum recovery valve, and fluid overflow recovery system (FIG. 2). This system includes: a pressurized fluid radiator (8) with fins (9) to conduct heat from the fluid to the surrounding air; a reservoir (12); a pressure valve (10) to regulate the pressure in the system; a vacuum relief valve (18) to allow the overflowed fluid to return to the system upon cool down at night via the vacuum relief valve (18) which is shown built into the pressure relief valve (10) (FIG. 6 shows these valves are plumbed in parallel, with pressure relief (10) being one-way out and vacuum recover (18) being one-way in); a fluid overflow and recovery reservoir (12) to the pressure relief (10) and vacuum recovery (18) valves via tube (72) while excluding non-condensable air, since tube (72) enters the fluid (13) below the surface level. The pressure of the fluid in the solar collector heat transfer loop is regulated by the pressure cap, which uses a spring (15) to push against the fluid pressure over a fixed area (11). During normal daily operation when the sun is out, the heat transfer fluid (13) expands as it heats from 75° Fahrenheit to over 230° Fahrenheit. When the pressure reaches the set pressure, i.e. 16 psig, fluid and any trapped air is pushed out past pressure relief valve (10) and overflows to the fluid overflow reservoir (12) via tube (72). In the overflow reservoir (12) the fluid is retained and the air bubbles move from the bottom of tube (72) which is below the liquid surface to the liquid surface, burst and are vented to the atmosphere by a cap (70). At night, when the fluid and condensable steam in the solar heat transfer system cools and contracts, fluid only is drawn back through vacuum relief valve (18), by the vacuum in the fluid loop caused by fluid contraction. The vacuum relief pressure is set by spring (16) to about −2 psig, into the heat transfer system to keep it full of fluid and keep non-condensable air out. Air in the system increases the corrosion of the fluid loop. This simple system allows the approximately 50% water/50% antifreeze mixture in the solar heat transfer loop to heat up to over 212° Fahrenheit, without boiling until it reaches almost 265° Fahrenheit, at 16 psig confinement pressure. This higher temperature allows for heat to be transferred more efficiently into the hot water tank, using lower flow rates and a small surface area internal (or external) hot water tank heat exchanger.

Figure 3:
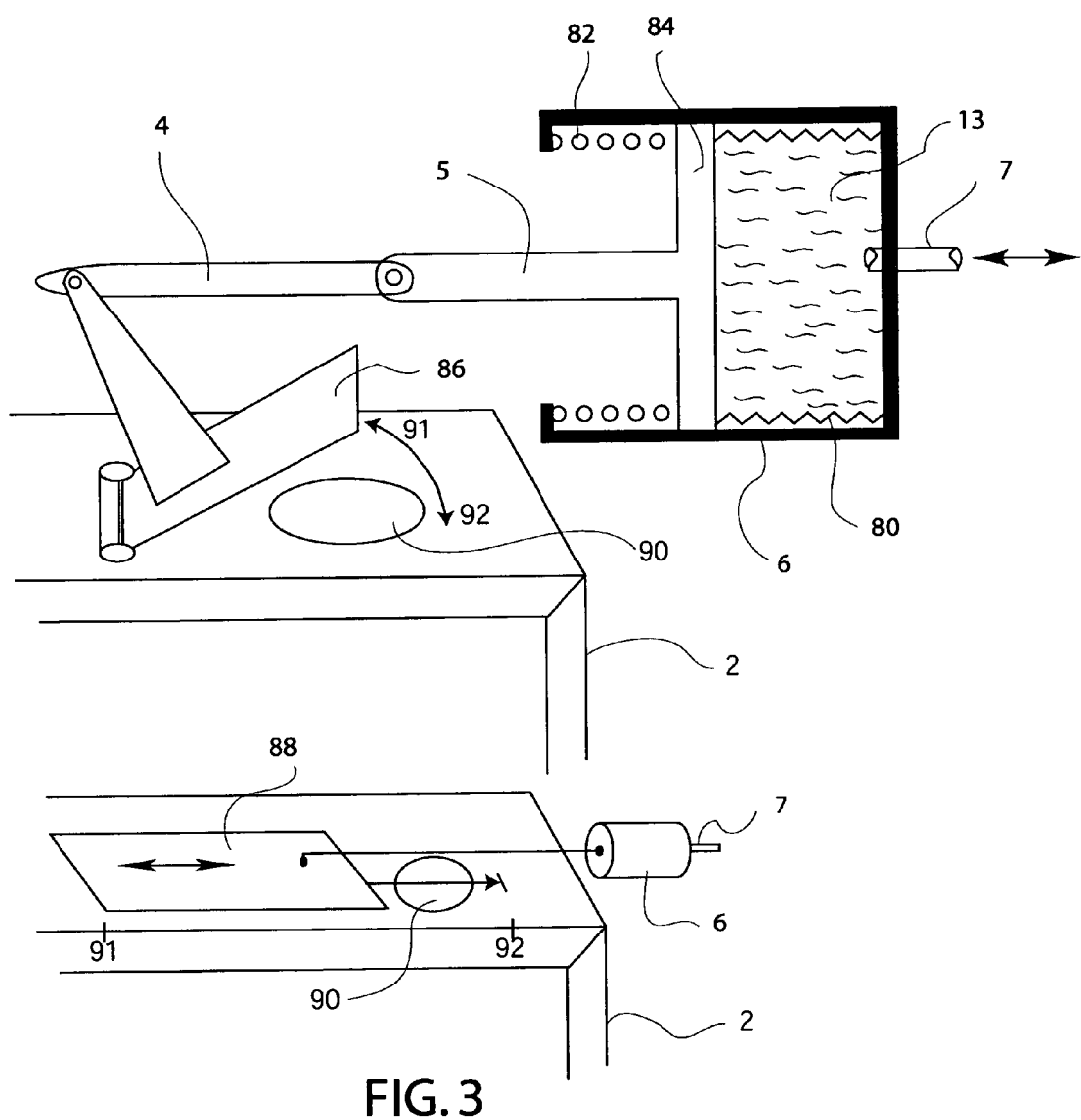
FIG. 3 is a pressure-actuated solar collector over-temperature control system, which opens dampers in the collector to let heat out, when the fluid in the solar collector boils and sustains the loop pressure to a point just below the regulated pressure.

The invention also consists of a pressure-actuated solar collector over-temperature protection system (FIG. 3). An integral part of the collector is a set of dampers (86 & 88) on both the top and bottom of the solar collectors, which are opened by pressure actuator (6). These dampers are only open when the solar heat collected is more than the hot water tank can use and the solar collector begins to boil. These dampers, when opened, allow outside air of less than 120° Fahrenheit to flow over the absorber plate (FIG. 1 (3)), where the sunlight is converted to heat and transferred into the heat transfer fluid. This airflow cools the absorber and stops the boiling. Then the dampers close and the absorber heats back up. The dampers open and close on a two to five minute cycle and only minor boiling is allowed to take place. This self-controlling feature is unique and allows the collector to protect itself, even if the fluid flow in the pressurized loop (FIG. 1. tubes 1, 14 & 17) stops.

The pressure-actuated control system is needed if fluid circulation stops for any reason while the sun is shining, i.e. controller turns off pump, or pump failure, or power failure, or fluid loop blockage. The pressure-actuated system consists of a solar system fluid pressure actuator (6), such as a piston (84), or other pressure actuator, which is in a retracted state at normal system operating pressure and in an extended state at the pressure cap relief setting, such as 16 psig. A spring (82) or a pressurized cavity can be used to return the actuator to the retracted state, when the solar system pressure falls to normal operating pressure. The solar system fluid (13) is sealed into the system via a bellows (80) or another acceptable seal, such as an O-ring. The actuator is connected to the fluid loop (7). This actuator output (5) is connected via linkage (4) to a hinged or a sliding valve (86, 88), like a furnace damper, which allows air to flow over the solar collector absorber plate (FIG. 1. (1)) and cools the absorber plate with outside air. Over-temperature protection is achieved by successive airflow movements over the solar collector absorber plate. When the solar collector gets too hot the heat transfer fluid (13) boils in the solar collector. This causes the pressure actuator to extend and open the collector air damper valves into position (91), opening up holes (90) for air movement over the solar collector absorber plate (FIG. 1. (1)), which takes the heat out of the solar collector and the heat transfer fluid temperature drops below the boiling point and stops boiling. When the system pressure returns to normal, the actuator retracts and closes the solar collector air damper valves into position (92). This air valve open/close cycle repeats itself until the sun goes down, or until the fluid flow is re-established. Thus the collector prevents damage to the system by keeping the collector near the pressurized boiling point of the water/antifreeze mixture under non-circulation conditions. Non-circulation can occur normally if the hot water tank is hot enough and the controller shuts off the pump and abnormally if the pump fails, power fails or the fluid flow path is blocked.

Figure 4:
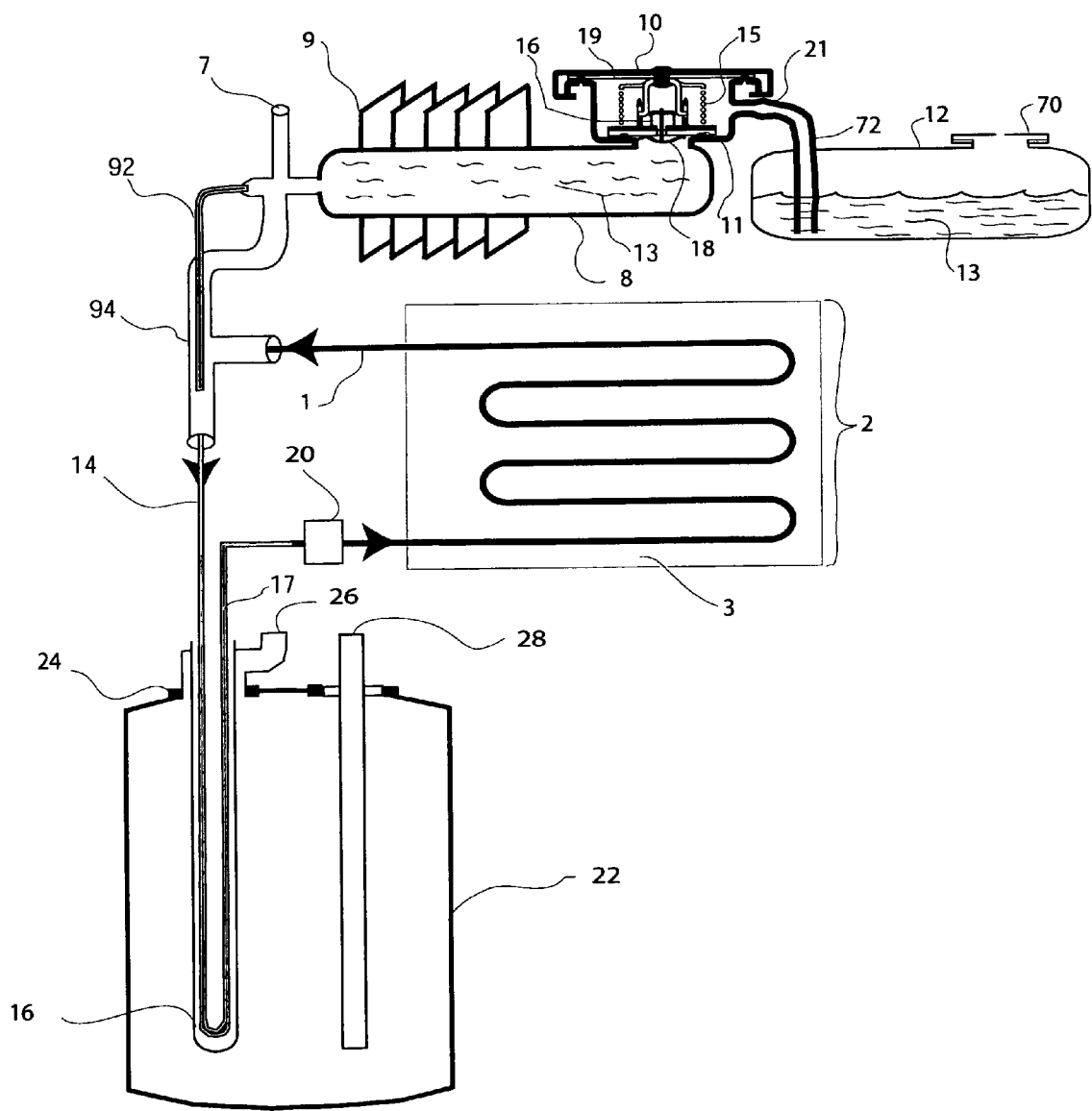
FIG. 4 is a boiling-activated solar collector over-temperature control system, which forces steam from the boiling solar collector into a pressurized liquid-to-air heat exchanger/radiator, which uses fins to reject heat from the radiator and condense the steam back to water, and then return this water to the main heat transfer loop.

The invention also consists of a boiling-activated solar collector over-temperature protection system (FIG. 4). The system consists of a pressurized liquid-to-air radiator heat exchanger, and a boiling gas, steam/liquid, separator. During normal operation, the entire system is full of heat transfer fluid (13) and no boiling occurs. The liquid-to-air heat exchanger (8) with fins (9) is a side arm and usually has no fluid flow in it. Normally the fluid flows into the boiling gas separator (94) from the solar collector tube (1) and out of the boiling gas separator down tube (14) to the hot water tank (22). Under non-flow conditions, such as circulating pump failure or the solar input being greater than the hot water tank can use the solar collector (2) will begin to boil. In this event, the boiling gas separator (94) allows the gas (steam) bubbles to go up by buoyancy into the liquid-to-air heat exchanger (8), which stirs the liquid in the heat exchanger, while condensing the boiling gas back to a liquid, and heats the heat exchange fins (9) above the outside air temperature and dissipates this heat from the pressurized liquid (13) in heat exchanger (8) to the outside air. The filler tube (92) allows condensed pressurized liquid to come from the liquid-to-air exchanger and be inserted below where the gas (steam) bubbles are being released tube (1) into the boiling gas separator (94) keeping the collector fluid loop (14 & 17) full of liquid, while liquid and gas, steam, exist in the collector (1) The water-based heat pipe system allows a small amount of boiling in the solar collector to take place; the generated steam travels up by buoyancy to the pressurized heat exchanger, which rejects heat to the atmosphere via the pressurized liquid (8) to the air radiator (9) heat exchanger. As long as solar collector boiling takes place, the pressurized liquid in the side arm heat exchanger (8) will be heated by condensing of the steam. Non-condensable air in the boiling solar collector will impede the flow of steam to the pressurized heat exchanger, so air must be kept out of the system. Only a small amount of fluid will be forced into a fluid overflow tube (72) into atmospheric reservoir (12). The advantage of this system over, the pressure-actuated solar collector air vents, is that boiling-activated heat pipe system has fewer moving parts and can easily dissipate all of the heat that the solar collector can gather from the sun, without pump power circulation of the heat exchange fluid.

Figure 5:
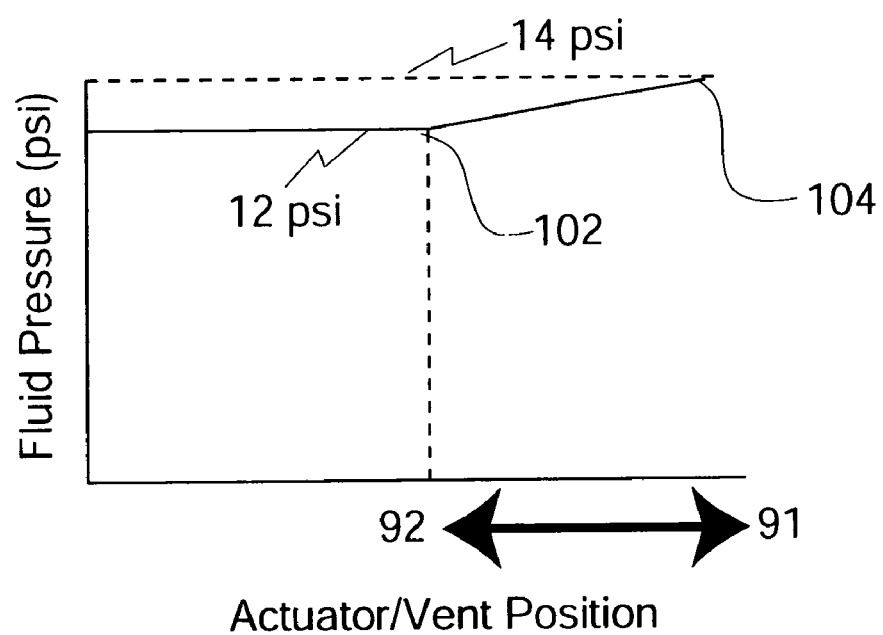
FIG. 5 is a plot of solar collector air valve position versus pressure in the solar collector fluid loop.

The graph in FIG. 5 shows the actuator and air valve position as a function of system pressure. The air valves (FIG. 3 (90)) are in the shut position (FIG. 3 (92)) and the actuator retracted until a pressure of approximately 80% (102) of the system pressure, maintained by the pressure relief valve (FIG. 4. (10)) is reached. At pressures above (102) the air valves begin to open and are fully open by the time the system reaches 95% (104) of the system pressure maintained by the pressure relief valve. This arrangement allows the system to cool itself before vigorous boiling occurs. The pressure versus actuator position profile is determined by the piston area (FIG. 3. (84)) and spring constant (FIG. 3. (82).

The preferred embodiment of the pressure/vacuum management and air elimination device is shown in FIG. 6. The pressure relief valve (10) limits the system pressure by allowing fluid to flow in one direction from the pressurized solar loop (1) to reservoir (12) at a set relief pressure, near 16 psig. Solar energy heats the fluid in the solar collector fluid loop (1) and it expands. Since the fluid loop is closed and contains only incompressible fluid and a very small amount of non-condensable gas, the pressure builds up rapidly until the pressure relief valve (10) set point is reached, then any gas trapped blows through the pressure relief valve (10) and fluid from the closed-loop also passes out through relief valve (10) through tube (72) into the bottom of reservoir (12) which holds unpressurized antifreeze fluid (13). Trapped gas then bubbles to the reservoir fluid (13) surface and back to the atmosphere. When the solar energy input ceases due to clouds or nightfall, the fluid in the solar collector fluid loop (1) contracts, causing a vacuum in the fluid loop (1). Antifreeze fluid (13) is drawn from the bottom of reservoir (12) through tube (72) through the one direction vacuum relief valve (18), set to about –2 psig, and back into the collector fluid loop (1). Air is eliminated from tube (72) because it is below the surface of antifreeze (13) in reservoir (12).

Figure 7:
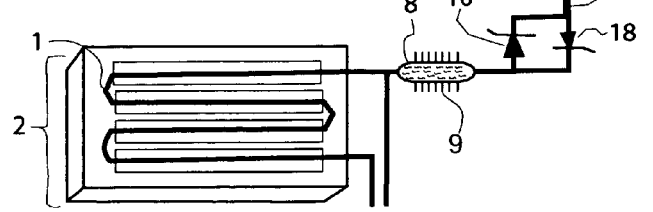
FIG. 7 Preferred embodiment of the boiling-activated pressurized radiator over-temperature protection device attached between the solar collector and the pressure/vacuum management and air elimination device.

The preferred embodiment of the pressurized liquid-to-air radiator over-temperature device is shown in FIG. 7. Pictorial views of this pressurized liquid-to-air radiator over-temperature device are shown in FIGS. 2 & 4. The pressurized fluid-filled radiator (8) is connected between the solar collector and the pressure relief valve (10) and the vacuum relief valve (18). The pressurized radiator (8) has fins (9) which allow heat to be conducted away from radiator (8) and given up to the surrounding air. Solar energy will cause solar collector fluid to turn to steam if there is no flow in the solar collector fluid loop (1). The steam follows a path to radiator (8) where the heat is conducted along the fins (9) and hence the surrounding air, which condenses the steam back to liquid water. This boiling and condensing under pressure keeps the solar collector from overheating. The pressure/vacuum management and air elimination device components; the pressure relief valve (10), vacuum relief valve (18), tube (72), reservoir (12) of atmospheric pressure antifreeze (13) are identical to FIG. 6 and function in the same way.

Figure 8:
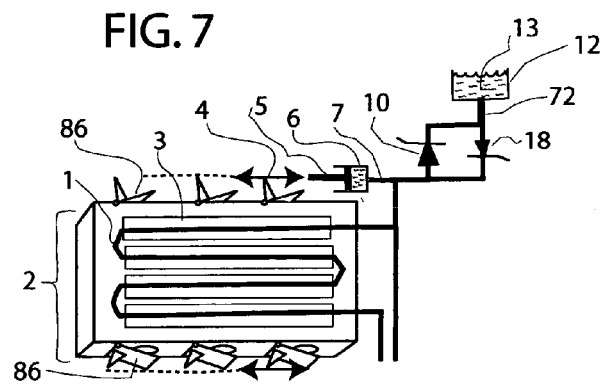
FIG. 8 Preferred embodiment of the pressure-actuated piston air damper over-temperature protection device, with the pressure tap between the solar collector and the pressure/vacuum management and air elimination device.

The preferred embodiment of the pressure piston-actuated air damper over-temperature device is shown in FIG. 8. Pictorial views of the piston and linkages are shown in FIG. 3. The pressure piston is connected via tube (7) between the solar collector fluid loop (1) and the pressure relief valve (10) and vacuum relief valve (18). Solar energy will cause solar collector fluid to turn to steam if there is no flow in the solar collector fluid loop (1). The steam makes its way to the pressure piston actuator (6) causing it to extend, which causes the actuator arm (5) to move and thus open the air dampers with motion (4). Outside air flowing over the solar collector panels containing the solar fluid loop (1) cools the fluid and the boiling stops. The pressure actuator (6) retracts, which causes the actuator arm (5) to move and thus close the air dampers with motion (4). This extension/retraction motion continues until the sun goes down or fluid circulation is restored. The pressure/vacuum management and air elimination device components; the pressure relief valve (10), vacuum relief valve (18), tube (72), reservoir (12) of atmospheric pressure antifreeze (13) are identical to FIG. 6 and function in the same way.

Figure 9:
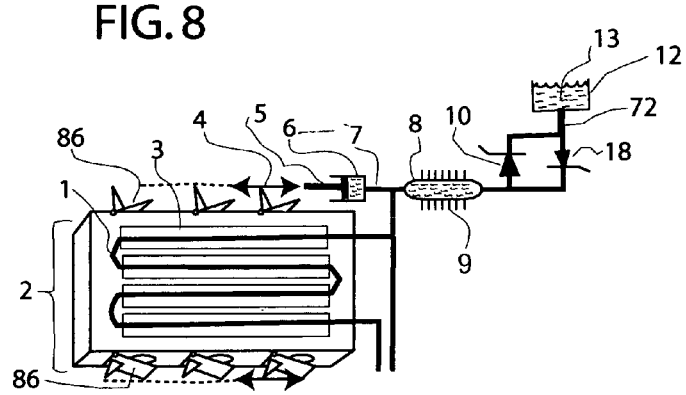
FIG. 9 Preferred embodiment of both boiling-activated pressurized radiator over-temperature and pressure-actuated piston air damper over-temperature protection device, with both the pressure tap and pressurized radiator between the solar collector and the pressure/vacuum management and air elimination device.

The preferred embodiment of both pressurized liquid-to-air radiator and pressure piston-actuated air damper over-temperature device is shown in FIG. 9. A pictorial view including both pressurized liquid-to-air radiator and pressure piston-actuated air damper over-temperature is shown in FIG. 1. Both the pressurized liquid-to-air radiator and pressure piston via tube (7) are connected between the solar collector fluid loop (1) and the pressure relief valve (10) and vacuum relief valve (18). Solar energy will cause solar collector fluid to turn to steam if there is no flow in the solar collector fluid loop (1). The steam makes its way to both the liquid-to-air radiator (8) and the pressure piston actuator (6). If the liquid-to-air radiator (8) condenses the steam as fast as it is generated then the pressure piston (6) does not extend. If the liquid-to-air radiator (8) can not condense the steam as fast as it is generated then the pressure piston (6) does extend, which causes the actuator arm (5) to move and thus open the air dampers with motion (4). Outside air flowing over the solar collector panels containing the solar fluid loop (1) cools the fluid and the boiling stops. The pressure actuator (6) retracts, which causes the actuator arm (5) to move and thus close the air dampers with motion (4). This extension/retraction motion continues until the liquid-to-air radiator (8) can condense all of the steam, as a result of the sun going down or fluid circulation restoration. The pressure/vacuum management and air elimination device components; the pressure relief valve (10), vacuum relief valve (18), tube (72), reservoir (12) of atmospheric pressure antifreeze (13) are identical to FIG. 6 and function in the same way.

The invention claimed is:
1. A solar heat transfer system comprising:
a one-way out pressurizing pressure relief valve;
a one-way in vacuum fluid recovery valve;
the pressure relief valve and the vacuum fluid recovery valve being plumbed in parallel from the highest single point in the solar heat transfer system to allow overflow fluid to exit to and return from a vented to atmosphere overflow/recovery reservoir;

the solar heat transfer system configured to accommodate nonflammable and low toxicity heat transfer fluid thermal expansion and contraction in a heat transfer loop by allowing fluid and boiling gas to leave upon heating, and, upon contraction, fluid is drawn back into the heat transfer system to keep it full of fluid and keep air out.

2. A fluid heat transfer loop over-temperature protection device comprising:

a solar heat transfer system configured to accommodate nonflammable and low toxicity heat transfer fluid thermal expansion and contraction and boiling gas generation in a heat transfer loop;

an overflow/recovery reservoir; and a gas condensing assembly comprising:
- a one-way out pressure relief valve fluidly connected to the overflow/recovery reservoir to allow overflow fluid to exit;
- a one-way in vacuum fluid recovery valve fluidly connected to the overflow/recovery reservoir to allow overflow fluid to return; and
- a liquid-to-air radiator arranged in series with the one-way out pressure relief valve and the one-way in vacuum fluid recovery valve;

wherein the boiling gas condensing assembly is located between the highest point on the heat transfer loop and the solar heat transfer system and is plumbed in parallel from the highest point in the system above the radiator to below the fluid level of an unpressurized overflow/recovery reservoir; and wherein overflow fluid and boiling gas flows through the one-way out pressure relief valve to the overflow/recovery reservoir, and fluid is drawn through the one-way in vacuum fluid recovery valve from the overflow/recovery reservoir into the boiling gas condensing assembly while keeping air out.

3. A solar collector over-temperature protection device comprising:

at least one absorber plate;
one or more air dampers;
an overflow/recovery reservoir;
a gas pressure-actuated piston; and
a heat transfer loop system fluidly connected to the pressure activated piston, comprising:
- a one-way out pressure relief valve fluidly connected to the overflow/recovery reservoir to allow overflow fluid to exit; and
- a one-way in vacuum fluid recovery valve fluidly connected to the overflow/recovery reservoir to allow overflow fluid to return;

the one-way out pressure relief valve and one-way in vacuum fluid recovery valve plumbed in parallel from the highest point in heat transfer loop system to allow overflow fluid to exit and return from a vented to atmosphere overflow/recovery reservoir, and to open air dampers that allow outside air to flow over and cool the solar collector's absorber plate wherein the piston pressure input is connected between the solar collector and the device to accommodate nonflammable and low toxicity heat transfer fluid thermal expansion/contraction by allowing fluid to enter and leave the solar heat transfer system, wherein the heat transfer loop system displaces air with fluid; and wherein overflow fluid and boiling gas flows through the one-way out pressure relief valve to the overflow/recovery reservoir, and fluid is drawn through the one-way in vacuum fluid recovery valve then back into the heat transfer loop from the overflow/recovery reservoir while keeping air out.

4. A solar collector over-temperature protection device comprising:

a gas condensing liquid-to-air radiator;
a pressure-actuated piston operated air damper;
and a one-way out pressurizing pressure relief valve;
a one-way in vacuum fluid recovery valve;
the pressure relief valve and the vacuum fluid recovery valve being plumbed in parallel from the highest single point in the solar heat transfer system to allow overflow fluid to exit and return from a vented to atmosphere overflow/recovery reservoir;

the solar heat transfer system configured to accommodate nonflammable and low toxicity heat transfer fluid thermal expansion and contraction in a heat transfer loop by allowing fluid and boiling gas to leave while fluid is drawn back into the solar heat transfer system, while keeping air out.

* * * * *